US012596814B1

(12) United States Patent
Kerr et al.

(10) Patent No.: US 12,596,814 B1
(45) Date of Patent: Apr. 7, 2026

(54) SECURITY INFORMATION AND EVENT MANAGEMENT (SIEM) TRIAGE ACTION ANALYSIS FEEDBACK SYSTEM

(71) Applicant: Morgan Stanley Services Group Inc., New York, NY (US)

(72) Inventors: Alec R. Kerr, Christiansburg, VA (US); Joseph T. Edmonds, Ellicott City, MD (US); Samuel J. Cook, Ellicott City, MD (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/327,421

(22) Filed: Sep. 12, 2025

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | | |
|---|---|---|---|---|
| 8,782,784 | B1 * | 7/2014 | Bruskin | H04L 63/1425 726/22 |
| 8,874,550 | B1 * | 10/2014 | Soubramanien | G06F 21/00 707/731 |
| 8,904,531 | B1 * | 12/2014 | Saklikar | H04L 63/1416 726/25 |

| | | | | |
|---|---|---|---|---|
| 9,064,210 | B1 | 6/2015 | Hart | |
| 9,069,930 | B1 * | 6/2015 | Hart | H04L 63/1408 |
| 9,282,114 | B1 * | 3/2016 | Dotan | G06F 21/577 |
| 9,601,000 | B1 * | 3/2017 | Gruss | G06F 21/552 |
| 10,049,220 | B1 * | 8/2018 | Hatsutori | H04L 63/1425 |

(Continued)

FOREIGN PATENT DOCUMENTS

WO    WO-2018175020 A1 *   9/2018   ......... H04L 63/1425

OTHER PUBLICATIONS

Bhatt et al.; "The Operational Role of Security Information and Event Management Systems"; Hewlett-Packard Laboratories; 2014; IEEE (Year: 2014).*

(Continued)

*Primary Examiner* — John B King
(74) *Attorney, Agent, or Firm* — HUNTON ANDREWS KURTH LLP

(57) ABSTRACT

Systems and methods for implementing a SIEM triage action analysis feedback loop are disclosed. An embodiment of the present invention is directed to analyzing Security Information and Event Management (SIEM) triage actions through a SIEM platform configured to receive interactions from analysts through a user interface or application programming interface and extract case state information before and after execution of each interaction, an action log database configured to store action logs, wherein each action log comprises metadata associated with an interaction and the extracted case state information, and an analytic platform configured to automatically analyze the action logs to identify patterns in analyst behavior and case characteristics, generate notifications based on the identified patterns, and automatically update SIEM case generation processes based on the identified patterns.

20 Claims, 5 Drawing Sheets

(56) References Cited

U.S. PATENT DOCUMENTS

| | | | | |
|---|---|---|---|---|
| 10,333,948 B2 * | 6/2019 | Rostamabadi | ...... | H04L 63/1416 |
| 10,404,751 B2 * | 9/2019 | Rajkumar | .......... | H04L 41/0631 |
| 10,616,258 B2 * | 4/2020 | Liang | .................. | H04L 63/1433 |
| 10,681,060 B2 * | 6/2020 | Scheidler | ............... | G06N 20/00 |
| 10,698,767 B1 * | 6/2020 | De Kadt | ............. | G06F 16/2315 |
| 10,834,120 B2 * | 11/2020 | Satish | ..................... | H04L 63/20 |
| 10,873,614 B2 * | 12/2020 | Kolan | ..................... | H04L 67/10 |
| 11,093,620 B2 * | 8/2021 | Tineo | .................... | G06F 9/4887 |
| 11,106,562 B2 * | 8/2021 | Su | ...................... | G06F 11/3616 |
| 11,283,829 B2 * | 3/2022 | Zorlular | ............. | H04L 63/1441 |
| 11,403,136 B1 * | 8/2022 | Willson | .................. | G06F 9/541 |
| 11,431,817 B2 * | 8/2022 | Kolan | ................ | H04L 67/1044 |
| 11,494,488 B2 * | 11/2022 | Syed | ..................... | G06F 21/577 |
| 11,621,970 B2 * | 4/2023 | Soliman | ................... | G06N 3/08 |
| | | | | 726/23 |
| 11,736,527 B1 | 8/2023 | Joseph Durairaj et al. | | |
| 11,818,156 B1 * | 11/2023 | Parikh | ................. | G06F 16/9537 |
| 12,190,161 B1 | 1/2025 | Kerr et al. | | |
| 12,271,757 B1 * | 4/2025 | Kerr | ..................... | G06F 21/554 |
| 12,423,150 B1 * | 9/2025 | Kerr | ..................... | G06F 9/5027 |
| 2006/0053334 A1 * | 3/2006 | Ingen | ................. | G06F 21/6218 |
| | | | | 714/2 |
| 2014/0090068 A1 * | 3/2014 | Guarnieri | ............. | G06F 21/577 |
| | | | | 726/25 |
| 2015/0163242 A1 * | 6/2015 | Laidlaw | ............. | H04L 63/1425 |
| | | | | 726/22 |
| 2016/0019091 A1 * | 1/2016 | Leber | ................. | G06F 11/0793 |
| | | | | 718/106 |
| 2018/0077183 A1 * | 3/2018 | Swann | ................ | H04L 63/1425 |
| 2018/0167402 A1 * | 6/2018 | Scheidler | ............... | G06N 20/00 |
| 2018/0288126 A1 * | 10/2018 | Smart | .................... | H04N 7/181 |
| 2018/0367549 A1 | 12/2018 | Jang et al. | | |
| 2019/0166145 A1 * | 5/2019 | Chauhan | ............... | G06F 21/577 |
| 2019/0303228 A1 * | 10/2019 | Kowta | ................ | H04L 41/5003 |
| 2019/0340353 A1 * | 11/2019 | Mitelman | ............. | G06F 21/554 |
| 2019/0356679 A1 * | 11/2019 | Sites | ................... | H04L 63/1416 |
| 2019/0384909 A1 * | 12/2019 | Ndu | ......................... | G06F 21/52 |
| 2020/0042700 A1 * | 2/2020 | Li | ......................... | G06F 21/554 |
| 2020/0134188 A1 * | 4/2020 | Bagheri | ................. | G06N 3/045 |
| 2020/0186569 A1 * | 6/2020 | Milazzo | .................. | H04L 63/08 |
| 2020/0327221 A1 | 10/2020 | Street | | |
| 2020/0336505 A1 * | 10/2020 | Neuvirth | ............ | H04L 63/1433 |
| 2020/0412751 A1 | 12/2020 | Thayer et al. | | |
| 2021/0110032 A1 * | 4/2021 | Yip | ....................... | G06F 21/602 |
| 2021/0306375 A1 | 9/2021 | Patel et al. | | |
| 2021/0352136 A1 | 11/2021 | Dojka et al. | | |
| 2022/0114252 A1 | 4/2022 | Syed et al. | | |
| 2022/0342707 A1 * | 10/2022 | Alagna | .............. | H04L 67/1097 |
| 2022/0343181 A1 * | 10/2022 | Thomas | ................ | G06F 40/295 |
| 2022/0345479 A1 * | 10/2022 | Markonis | ........... | H04L 63/1433 |
| 2022/0368696 A1 * | 11/2022 | Karpovsky | .......... | H04L 63/102 |
| 2023/0252138 A1 * | 8/2023 | McCarthy | ............ | G06F 21/566 |
| | | | | 726/25 |
| 2024/0080337 A1 * | 3/2024 | Matefi | .................... | G06N 20/00 |
| 2024/0089293 A1 * | 3/2024 | Singla | ................ | H04L 63/1416 |
| 2024/0152371 A1 * | 5/2024 | He | ...................... | G06F 9/45558 |
| 2024/0192974 A1 * | 6/2024 | Gadupudi | .............. | G06F 9/544 |
| 2024/0256421 A1 * | 8/2024 | Alexander | ............. | G06F 17/40 |
| 2024/0394311 A1 * | 11/2024 | Dash | .................. | G06F 16/9024 |
| 2025/0175456 A1 | 5/2025 | Crabtree et al. | | |

OTHER PUBLICATIONS

Granadillo et al.; "New types of Alert Correlation for Security Information and Event Management Systems"; 2016 IEEE (Year: 2016).*

Granadillo et al.; "Security Information and Event Management (SIEM): Analysis, Trends, and Usage in Critical Infrastructures"; Cybersecurity Unit, Atos Research & Innovation, Spain; https://doi.org/10.3390/s21144759 (Year: 2021).*

* cited by examiner

SECURITY INFORMATION AND EVENT MANAGEMENT (SIEM) TRIAGE ACTION ANALYSIS FEEDBACK SYSTEM

FIELD OF THE INVENTION

The present invention relates generally to Security Information and Event Management (SIEM) systems, and more specifically to a system for analyzing analyst interactions with SIEM platforms to generate feedback loops that improve platform efficiency and case generation processes.

BACKGROUND

Security Information and Event Management (SIEM) systems serve as centralized platforms for collecting, analyzing, and managing security-related data from various sources within an organization's IT infrastructure. These systems aggregate logs, alerts, and other security events to provide security analysts with a comprehensive view of potential threats and incidents. SIEM platforms typically include various components and tools that enable security professionals to investigate, triage, and respond to security events.

Security analysts interact with SIEM platforms through multiple interfaces and components to perform case triage activities. During the triage process, analysts examine security alerts, investigate potential incidents, gather contextual information, and make determinations about the severity and legitimacy of detected events. These interactions involve various actions such as viewing alert details, enriching cases with additional data, updating case status and documenting findings. The complexity of these interactions can vary based on the type of security event, the analyst's experience level, and the specific tools available within a particular SIEM platform.

The cybersecurity landscape continues to evolve rapidly, with new threats and techniques emerging regularly. This dynamic environment places increasing demands on SIEM platforms to adapt and improve their capabilities to remain effective and efficient. Organizations rely on these systems to process large volumes of security data efficiently while providing analysts with the tools and information needed to identify and respond to legitimate threats promptly.

Traditional approaches to SIEM platform development and optimization often rely on periodic reviews or reactive responses to identified issues. However, these methods generally do not capture the full scope of how analysts interact with the system during their daily operations. Without comprehensive visibility into usage patterns and analyst behaviors, SIEM platforms may develop inefficiencies, underutilized features, or suboptimal workflows that impact overall security operations effectiveness.

Accordingly, there is a need for an improved system and method for analyzing how security analysts interact with SIEM platforms to ascertain valuable insights and efficiencies.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an embodiment of the present invention, a computer-implemented system analyzes Security Information and Event Management (SIEM) triage actions. The computer-implemented system comprises: an interface configured to receive one or more interactions from an analyst through an interactive user interface or an application programming interface (API); a database configured to store action logs wherein each action log comprises metadata associated with an interaction and a case state information; and an analytic platform comprising a computer processor coupled to the interface and the database and further configured to perform the steps of: receiving one or more analyst interactions with at least one SIEM component; extracting case state information before and after each analyst interaction; storing one or more action logs in the database, wherein each action log comprises metadata associated with the one or more analyst interactions and the extracted case state information; automatically analyzing the one or more action logs to identify patterns in analyst behavior and one or more case characteristics; generating a notification based on the identified patterns; and automatically updating a SIEM case generation process based on the identified patterns.

According to another embodiment, a computer-implemented method comprises the steps of: receiving, via an interface, one or more analyst interactions with at least one SIEM component; extracting, via the interface, case state information before and after each analyst interaction; storing, via a database, one or more action logs in the database, wherein each action log comprises metadata associated with the one or more analyst interactions and the extracted case state information; automatically analyzing, via an analytic platform comprising a computer processor, the one or more action logs to identify patterns in analyst behavior and one or more case characteristics; generating, via the computer processor, a notification based on the identified patterns; and automatically updating, via the computer processor, a SIEM case generation process based on the identified patterns.

An embodiment of the present invention is directed to a SIEM Triage Action Analysis Feedback system that logs and analyzes analysts' interactions within a Security Information and Event Management (SIEM) platform. By tracking how analysts triage cases using various components and tools, an embodiment of the present invention identifies patterns and insights that assist developers to refine SIEM tools and improve overall productivity. For example, a custom code hook may be implemented to log interactions around SIEM components, capturing data before and after their execution. This data may be analyzed to provide insights into analyst productivity and guide future SIEM enhancements and features.

By examining the action log timelines, which detail each step an analyst takes during case triage, developers may compare behaviors of different analysts and cases. Deviations in an analyst's historical behavior may signal more significant cases, prompting developers to adjust case criteria accordingly. If an analyst's triage actions differ considerably from the norm or baseline, this may indicate inefficiencies thereby necessitating guidance. In addition, efficient analysts may serve as models for improved strategies. Replayable Action Log Timelines, through a SIEM API, enable developers to understand and compare triage actions across cases, fostering continuous improvement.

The foregoing general description of the illustrative embodiments and the following detailed description thereof are merely exemplary aspects of the teachings of this disclosure and are not restrictive.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to a SIEM Action Log Analytic Platform that receives analysts' interactions within a SIEM system and analyzes triage patterns to extract insights which inform updates and development of SIEM features and functions. As analysts triage SIEM cases, they will interact with various tools to update case content, gather context, remediate incidents, etc. These SIEM actions differ on a per-analyst and per-case basis. With an embodiment of the present invention, patterns and insights may be identified to assist SIEM developers to improve tools and identify inefficiencies and opportunities.

For example, a custom code hook may be used to inject a logging mechanism around interactable components of a SIEM system. As analysts invoke SIEM components, contextual data may be collected including the state of a SIEM case before and after SIEM component executions. This data may be referred to as SIEM Action Logs. Analysis via the SIEM Action Log Analytic Platform provides insights which may be used to inform the understanding of analyst productivity within a SIEM system and future SIEM development priorities.

In addition to analyzing individual components, SIEM Action Logs provide a detailed timeline of the steps an analyst takes to triage each SIEM case. Comparing the action log timelines of different cases/analysts reveals patterns and insights. To account for analysts of varying experience and skill, different weights may be applied. Also, the complexity of a case and unique characteristics may be considered. For example, an analyst's triage actions deviating from their historic behavior may indicate that a particular SIEM case is more interesting than its counterparts. This may then prompt SIEM developers to adjust case creation criteria to surface more impactful activity.

Further, an analyst's triage actions may significantly deviate from those of an average analyst. This may indicate inefficiencies in their triage flow and prompt correction and/or guidance from a team. Conversely, a particularly efficient analyst's Action Log timelines may inform better (e.g., more efficient, accurate) strategies for the rest of the team. Action Logs Timelines may be replayed on any case via a SIEM API. This may be used to assist developers understand how a case was triaged and how those triage actions apply to other cases. Replaying action log timelines may also be useful for automating the triage of a case with minimal analyst interaction.

Figure 1:
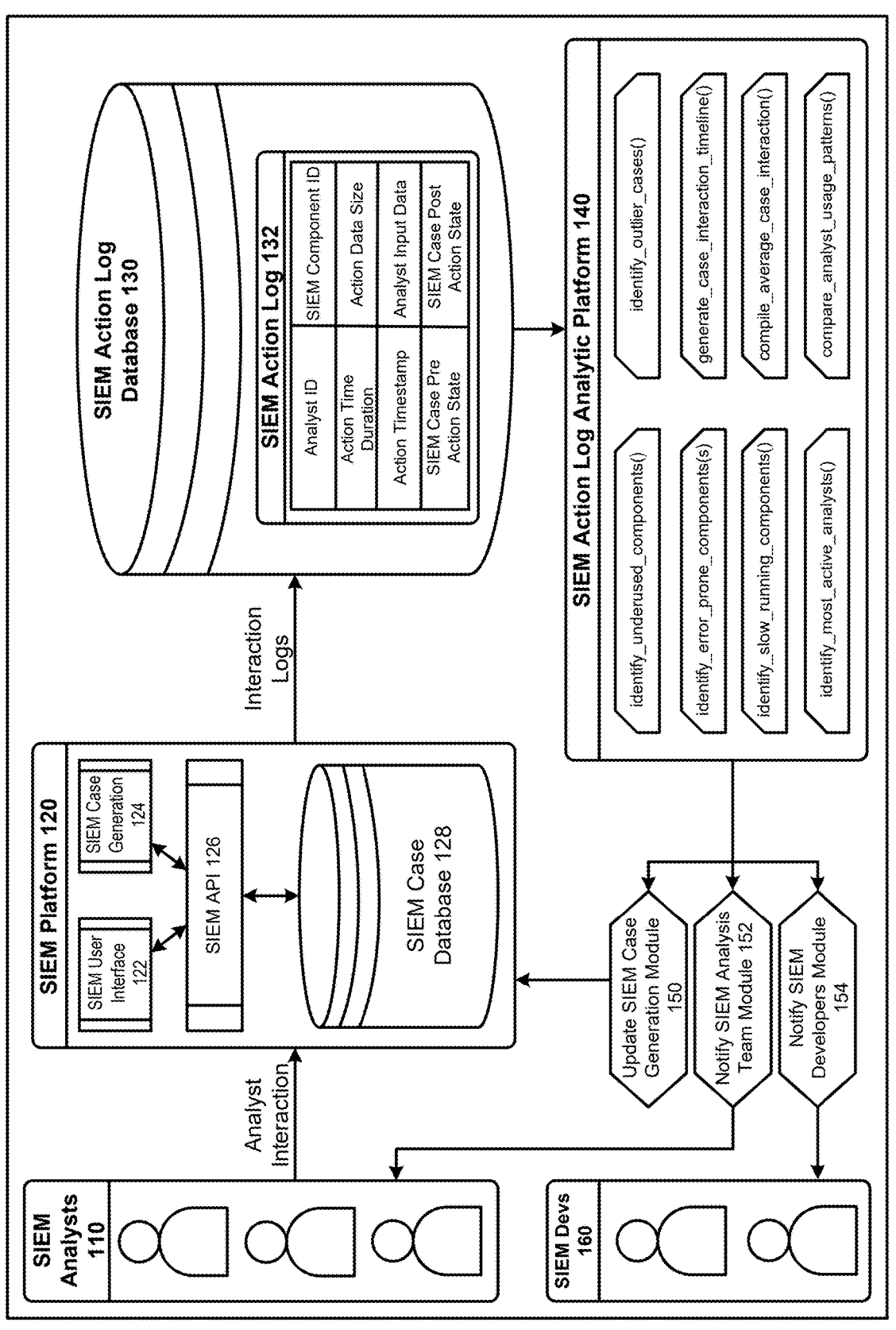
FIG. 1 is an exemplary system diagram illustrating a Security Information and Event Management (SIEM) action analysis system, according to an embodiment of the present invention.

FIG. 1 is an exemplary system diagram illustrating a Security Information and Event Management (SIEM) action analysis system, according to an embodiment of the present invention. An embodiment of the present invention may monitor analyst interactions and generate feedback for system improvement.

As shown in FIG. 1, an embodiment of the present invention provides comprehensive monitoring and analysis of analyst interactions within a cybersecurity environment. SIEM analysts 110 may interact with SIEM Platform 120 through multiple pathways to perform security incident triage and analysis activities. SIEM Platform 120 may include several interconnected components that facilitate case management, data processing, and analyst workflow operations. SIEM Action Log Database 130 may capture detailed interaction data, while SIEM Action Log Analytic Platform 140 processes the information to generate actionable insights for system improvement and optimization.

SIEM Platform 120 may include SIEM User Interface 122 that provides a graphical interface for analyst interactions with security cases and related data. For example, SIEM Analysts 110 may access SIEM Platform 120 through SIEM User Interface 122 to perform various triage activities such as case review, alert analysis, and incident response actions. In addition, SIEM Platform 120 may include SIEM API 126 that enables direct programmatic access to platform functionality. SIEM Analysts 110 may interact with SIEM Platform 120 through SIEM User Interface 122 and SIEM API 126, providing multiple access methods for different workflow requirements and technical preferences. This approach allows analysts to utilize graphical tools for complex analysis while also enabling command-line or script-based interactions for automated or repetitive tasks.

SIEM Platform 120 may further include SIEM Case Generation 124 that creates and manages security incident cases based on incoming alert data and predefined criteria. SIEM Case Generation 124 may communicate with SIEM API 126 to create, modify, and update case information within the system. SIEM Case Database 128 may store case data, including alert information, analyst notes, case status, and associated metadata. SIEM Case Generation 124 may utilize SIEM API 126 to interface with SIEM Case Database 128, enabling automated case creation and management processes. For example, SIEM Case Generation 124 may aggregate multiple related alerts into single cases, apply enrichment data, and establish case priorities based on threat intelligence and organizational policies.

As shown in FIG. 1, SIEM Action Log Database 130 may maintain detailed records of analyst interactions with SIEM Platform 120 through SIEM Action Log records, as shown by 132. Each action log record may contain specific metadata fields that capture comprehensive information about individual analyst actions. SIEM Action Log 132 may include an analyst ID that identifies the specific analyst performing the action, a SIEM component ID that specifies which platform component was utilized, and an action duration that measures the time required to complete the action. Additional metadata fields within SIEM Action Log 132 may encompass data size measurements indicating the volume of information processed, timestamp information marking when the action occurred, and analyst input data capturing any parameters or information provided by the analyst during the interaction. SIEM Action Log 132 may also store pre-action and post-action case state information, documenting the condition of the case before and after the analyst's interaction to track changes and modifications made during the triage process.

SIEM Action Log Analytic Platform 140 may process the accumulated data from SIEM Action Log Database 130 to extract patterns, identify trends, and generate insights about analyst behavior and system performance. SIEM Action Log Analytic Platform 140 may analyze SIEM Action Log 132 to understand how analysts interact with different components, identify usage patterns across case types, and detect anomalies or inefficiencies in triage workflows.

For example, SIEM Action Log Analytic Platform 140 may generate observations including: identify underused components (e.g., removing/improving under-utilized SIEM components and features); identify error prone components (e.g., finding and fixing SIEM component bugs); identify slow running components (e.g., improving the runtime of slow components); identify most active analysts (e.g., identifying high performing analysts); identify outlier cases (e.g., identify unconventional usage of existing components which may lead to component redesign and/or new components); generate case interaction timelines (e.g., identify detailed step-by-step analyst interactions); compile average case interactions (e.g., identifying an analyst average or baseline); compare analyst usage patterns (e.g., comparing SIEM Action log timelines of different case-types to identify impactful cases and improve future case creation; comparing SIEM Action log timelines of different analysts to identify efficiencies and inefficiencies within analyst's triage behavior); and other observations (e.g., creating new components to reduce the actions required in triage; replaying triage actions on SIEM cases to understand triage strategies and efficiencies).

Based on this analysis, SIEM Action Log Analytic Platform 140 may generate outputs that address different aspects of system improvement and optimization. An embodiment of the present invention supports the analysis of SIEM user behavior to facilitate observations and notifications of trends and patterns which enable SIEM developers and users to understand and iteratively improve the SIEM and its contents over time. For example, notifications may be provided to SIEM users and developers when insightful patterns and trends are identified.

An embodiment of the present invention recognizes that a lack of understanding regarding how users interact with a SIEM system can lead to inefficiencies and reduced usefulness of the platform. Further, the omission of ongoing SIEM usage analysis prevents a SIEM's tools and cases from adapting to a changing environment and cybersecurity landscape. A SIEM platform that supports a triage action analysis feedback loop provides understanding and insights regarding how triage analysts interact with a SIEM platform to improve the SIEM platform's efficiency, usability, and case quality.

Update SIEM Case Generation Module 150 may enable automatic modifications to case creation processes based on analytical findings from SIEM Action Log Analytic Platform 140. Update SIEM Case Generation Module 150 may trigger adjustments to SIEM Case Generation 124 when analysis indicates that certain case types receive minimal analyst attention or follow predictable triage patterns.

Notify SIEM Analysis Team Module 152 may provide process-related feedback to analyst teams, highlighting workflow inefficiencies, training opportunities, and/or procedural improvements that may enhance triage effectiveness.

Notify SIEM Developers Module 154 may communicate technical findings to SIEM Developers 160 who may implement system enhancements, bug fixes, and/or performance improvements based on the analytical insights.

These automatic updates may include modifications to case creation criteria, alert aggregation rules, and/or case prioritization algorithms. The outputs provided by SIEM Action Log Analytic Platform 140 creates a comprehensive feedback loop that addresses technical system improvements through automated system enhancement using case generation updates, process optimization through analyst team notifications and developer notifications. SIEM Developers 160 may receive actionable information about component performance, error rates, and usage patterns that inform development priorities and system maintenance activities.

An embodiment of the present invention provides actionable insights for SIEM development by identifying patterns in analyst behavior to guide improvements, such as optimizing tools, removing underutilized features, or redesigning workflows. Impactful case identification enables detection of cases with unconventional triage patterns, helping prioritize high-impact incidents for further analysis. Comparative analysis enables cross-case and cross-analyst comparisons via SIEM Action Log timelines to benchmark productivity and workflows.

Figure 2:
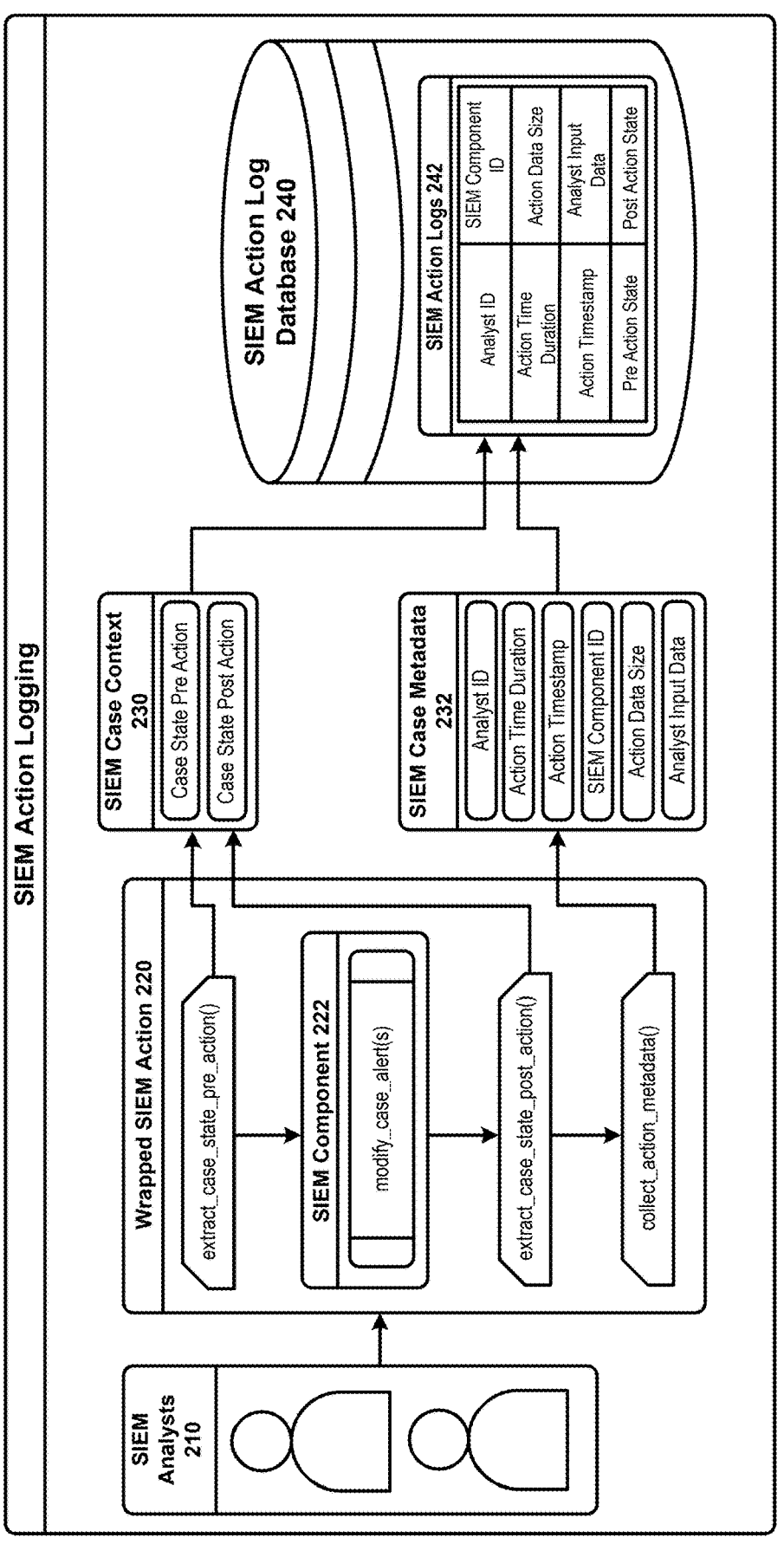
FIG. 2 is an exemplary system diagram illustrating a SIEM action logging system, according to an embodiment of the present invention.

FIG. 2 is an exemplary system diagram illustrating a SIEM action logging system, according to an embodiment of the present invention.

FIG. 2 illustrates SIEM Action Logging that provides detailed monitoring and recording of analyst interactions through an interceptive mechanism that captures comprehensive metadata about each action performed within the security platform. SIEM Analysts 210 may interact with Wrapped SIEM Action 220 that transparently intercepts and logs analyst activities without disrupting normal workflow operations. Wrapped SIEM Action 220 may contain SIEM Component 222 that executes functionality requested by the analyst while simultaneously collecting contextual information about the interaction. This interceptive approach enables comprehensive logging of analyst behavior patterns and system usage without requiring modifications to existing analyst procedures or training on additional logging interfaces.

Wrapped SIEM Action 220 may extract case state both before and after component execution to capture the complete context of changes made during the action. For example, when an analyst initiates an action, Wrapped SIEM Action 220 may extract and record the current state of the case before allowing SIEM Component 222 to execute the requested operation. After SIEM Component 222 completes the requested action, Wrapped SIEM Action 220 may again extract the case state to document any modifications, additions, and/or deletions that occurred as a result of the analyst's interaction. This extraction process creates a comprehensive record of how each analyst action transforms case data, enabling detailed analysis of workflow patterns and case evolution throughout the triage process. An embodiment of the present invention may maintain SIEM Case Context 230 that encompasses the complete environmental and situational information surrounding each analyst interaction, including case status, a number of alerts, a number of comments, a number of observables, full case comments, full case alerts, evidence collections, and other categorical data that may influence or be influenced by analyst actions.

SIEM Case Metadata 232 may include detailed information about case characteristics and analyst interaction parameters, including analyst identifier, action time duration, action timestamp, SIEM component identifier, action data size, analyst input data, etc. In some cases, SIEM Case Metadata 232 may capture error conditions, system performance metrics, and environmental factors that may affect analyst productivity and/or system responsiveness. The comprehensive nature of SIEM Case Metadata 232 enables detailed analysis of analyst behavior patterns, system performance characteristics, as well as case complexity factors that influence triage efficiency and effectiveness.

SIEM Action Log Database 240 may store and manage comprehensive interaction logs that enable the creation of detailed case interaction timelines showing the complete sequence of analyst actions from case claim to closure. SIEM Action Log Database 240 maintains SIEM Action Logs 242 that contain structured records of each analyst interaction with the system. Each SIEM Action Log may include specific fields such as case identifier for identifying a specific case within the SIEM the user interacted with, analyst identifier for identifying the individual performing the action, action time duration for measuring the temporal requirements of the interaction, action timestamp for establishing chronological sequences, SIEM component identifier for specifying which system component was utilized, action data size for quantifying the volume of information processed, analyst input data for recording parameters or information provided during the interaction, pre-action state for documenting case conditions before the action, and post-action state for capturing case modifications resulting from the action. The structured format of SIEM Action Logs 242 enables systematic analysis of analyst behavior patterns, case complexity factors, and system performance characteristics across different case types, analyst skill levels, and temporal periods.

Figure 3:
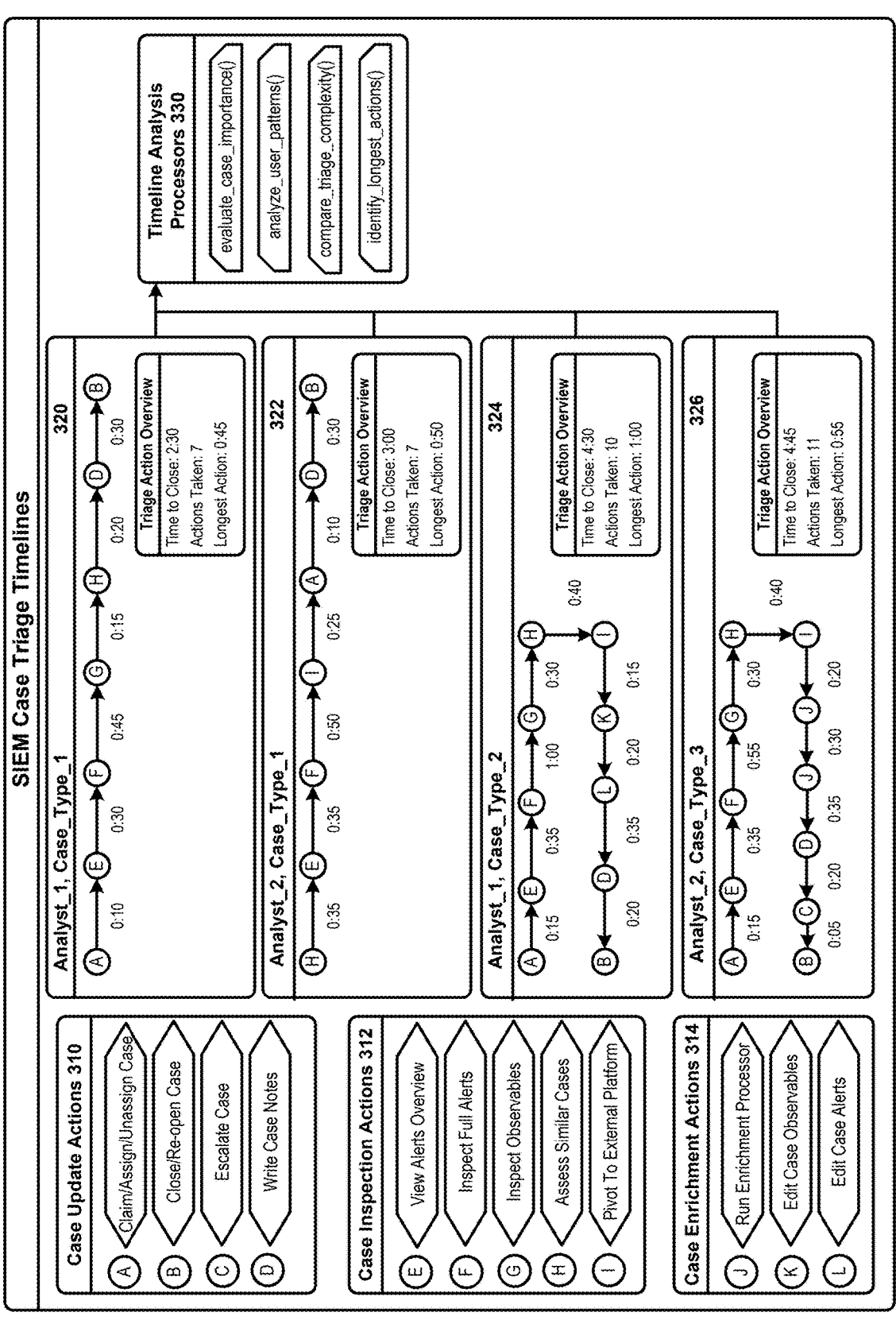
FIG. 3 is an exemplary system diagram illustrating SIEM case triage timelines, according to an embodiment of the present invention.

FIG. 3 is an exemplary system diagram illustrating SIEM case triage timelines, according to an embodiment of the present invention.

As shown in FIG. 3, an embodiment of the present invention provides comprehensive SIEM case triage timelines and analysis that provide detailed categorization of analyst actions and systematic evaluation of case handling patterns across different analysts and case types. An embodiment of the present invention organizes analyst interactions into distinct functional categories that serve different purposes within the security incident triage process. SIEM components may be categorized into distinct types that encompass the full spectrum of analyst activities during case investigation and resolution.

Case Update Actions 310 may include operations that modify the fundamental status and assignment characteristics of security cases within the SIEM platform 120. These actions may include: claiming/assigning/unassigning cases to specific analysts; closing completed cases and reopening cases that require additional investigation; escalating cases to higher-tier analysts or management; and writing case notes or comments relating to the triage process.

Case Inspection Actions 312 may include: viewing alert overviews that provide summarized information about security events associated with the case; inspecting full alert details that contain comprehensive technical data and metadata; inspecting observables such as IP addresses, domain names, file hashes, and other indicators of compromise; assessing similar cases that have been identified through automated correlation processes; and pivoting to external threat intelligence platforms or security tools that provide additional context about the security incident.

Case Enrichment Actions 314 may involve operations that enhance case data through automated processing, manual data entry, or integration with external information sources. Case Enrichment Actions 314 may include: running or executing enrichment processors that gather additional context about observables; editing case observables; and editing case alerts. The actions and operations are exemplary only and may encompass other categories of actions and specific operations.

An embodiment of the present invention may generate detailed timeline sequences that document the chronological progression of analyst actions from initial case assignment through final resolution. A first analyst timeline 320 demonstrates a streamlined triage approach where an analyst follows a systematic sequence of inspection and update actions to efficiently process a security case. The first analyst timeline 320 may show an analyst claiming a case, reviewing alert overviews, examining detailed alert information, inspecting observables, assessing similar cases, documenting findings through case notes, and closing the case upon completion of the analysis. A second analyst timeline 322 illustrates a more complex triage pattern that incorporates additional enrichment activities and external platform interactions. The second analyst timeline 322 may demonstrate how analysts handle cases that require deeper investigation, including pivoting to external platforms for additional context, modifying case observables based on analysis findings, and editing alert collections to refine the scope of the security incident.

A third analyst timeline 324 and a fourth analyst timeline 326 provide additional examples of triage patterns that may occur across different case types, analyst experience levels, and incident complexity factors. The third analyst timeline 324 may illustrate scenarios where analysts encounter cases requiring multiple enrichment processor executions, extensive observable analysis, or coordination with external security teams.

The fourth analyst timeline 326 may demonstrate triage patterns associated with high-priority incidents that involve escalation procedures, management notifications, or integration with incident response protocols. Each timeline sequence includes temporal measurements that quantify the duration between actions, total time required for case completion, and identification of the longest individual action within the sequence. These temporal metrics enable systematic comparison of triage efficiency across different analysts, case types, and time periods.

Timeline Analysis Processors 330 may systematically evaluate the accumulated timeline data to extract patterns, identify anomalies, and generate insights about case handling effectiveness and analyst behavior characteristics. As shown in FIG. 3, Timeline Analysis Processors 330 may evaluate case importance; analyze user patterns; compare triage complexity; and identify longest running actions to provide comprehensive insights about security operations performance. Other evaluations may be supported.

Timeline Analysis Processors 330 may generate various timeline analysis and insights. In an exemplary scenario involving Analyst 1, the rapid closure of case type one and the absence of enrichment actions may suggest that case type 1 is less valuable. It may also reflect the analyst's unfamiliarity with this case type or a lack of thoroughness in their triage process.

Regarding another example involving Analyst 2, an execution of a series of actions before claiming the case may indicate a lack of familiarity with case type 1.

In the context of case type 2, a long time to close and high action account may indicate a higher level of case complexity. According to another example, case type 2's inclusion of an alert/observable edit actions may indicate that this case type's creation process needs refinement.

In the example of case type 3, inclusion of multiple enrichment processor executions and an escalation action may indicate that this case type has a high level of importance and confidence. The substantial actions taken and the eventual escalation of the case serve as strong indicators of its significance, warranting further attention and prioritization.

Timeline Analysis Processors 330 may assess case insights by analyzing various factors such as the number of enrichment actions performed, the total time invested in case analysis, the frequency of external platform consultations, the occurrence of case escalations or management notifications, etc.

Figure 4:
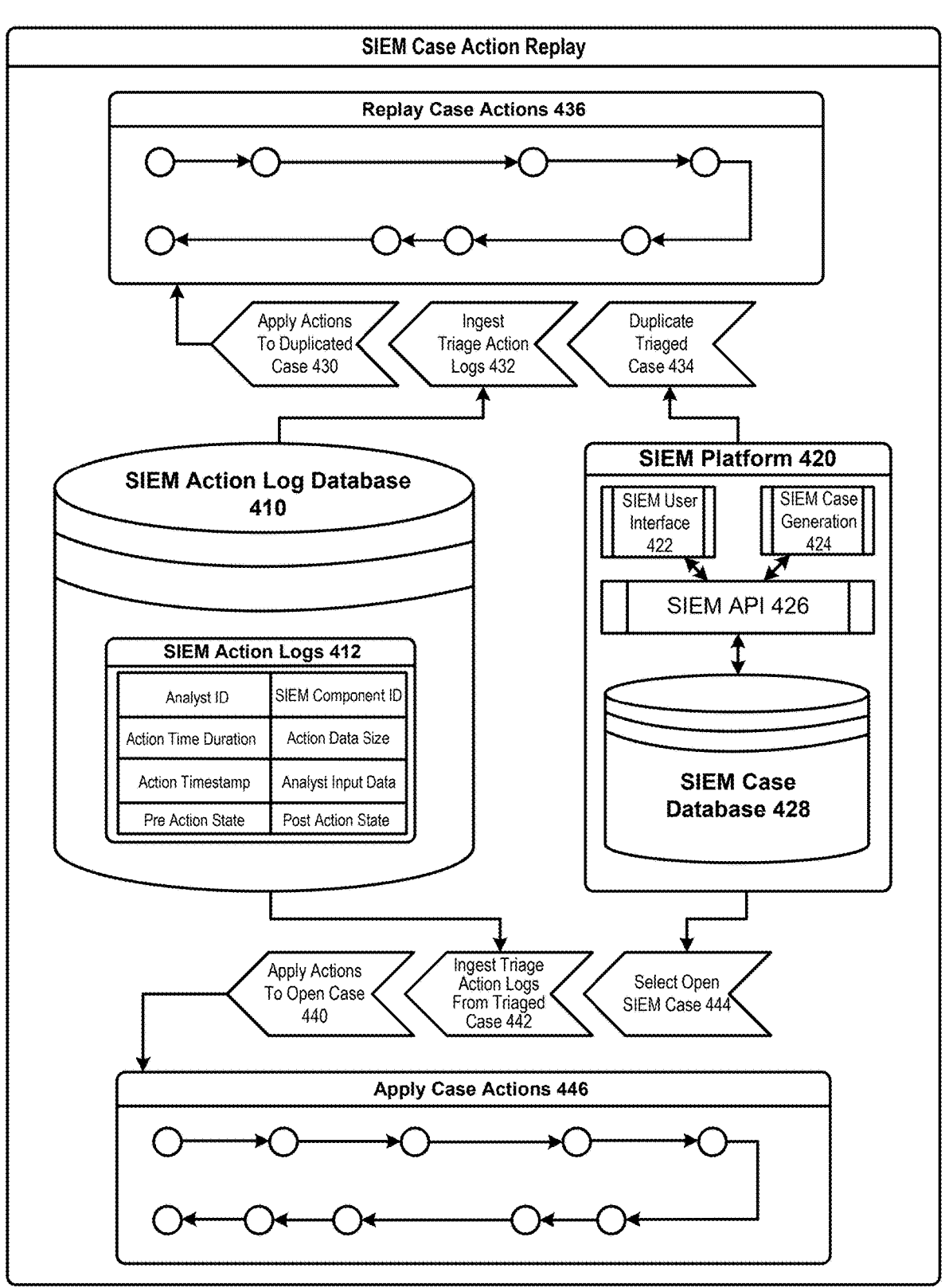
FIG. 4 is an exemplary diagram illustrating SIEM case action replay, according to an embodiment of the present invention.

FIG. 4 is an exemplary diagram illustrating SIEM Case Action Replay, according to an embodiment of the present invention.

As shown in FIG. 4, an embodiment of the present invention provides SIEM Case Action Replay capabilities that enable comprehensive reconstruction and application of analyst triage patterns through distinct operational workflows that leverage historical interaction data to enhance case processing efficiency and provide training opportunities for security operations teams. SIEM Action Log Database 410 may store and manage comprehensive records of analyst interactions through SIEM Action Logs 412 that capture detailed metadata about each triage action performed within a security platform. Each SIEM Action Log record may include structured information including analyst identification data, SIEM component specifications, temporal measurements such as action duration and timestamps, data volume metrics, analyst input parameters, and comprehensive case state documentation that records conditions before and after each analyst interaction. SIEM Action Log Database 410 may serve as a foundational data source for replay workflows, providing the historical interaction patterns and sequential action data that enable accurate reconstruction of triage processes and intelligent application of learned patterns to new security cases.

SIEM Platform 420 may provide an operational environment for case management and analyst interactions through multiple interface mechanisms through SIEM User Interface 422 and SIEM API 426. SIEM Case Generation 424 may create and manage security incident cases. SIEM Platform 420 may support SIEM Case Database 428 that stores and manages comprehensive case information including alert collections, analyst annotations, case status indicators, and associated metadata that documents the complete lifecycle of security incidents from initial detection through final resolution. SIEM Platform 420 coordinates replay workflows through SIEM API 426, enabling systematic reconstruction of historical triage processes and intelligent application of learned patterns to active security cases.

A first operational workflow may focus on replaying historical case actions on duplicated cases to enable detailed analysis of triage processes and provide training opportunities for security analysts, as shown by Replay Case Actions

436. Actions may be applied to duplicated case, as shown by 430. This may involve creating exact replicas of previously triaged cases, preserving all original case data including alert collections, observable indicators, and initial case metadata while establishing separate case instances that may be modified without affecting historical records.

Triage action logs may be ingested, as shown by 432. This may involve retrieving relevant action log records from SIEM Action Log Database 410 based on the original case identifier and analyst specifications, gathering the complete sequence of interactions that occurred during the initial triage process. Retrieved action log records may be organized in chronological order to establish a precise sequence of analyst actions that transformed the case from initial assignment through final resolution.

Triaged cases may be duplicated, as shown by 434, to ensure that case attributes, alert associations, and metadata characteristics match the original case conditions at the time of initial analyst assignment. Multiple duplicate instances may be created to support parallel analysis scenarios, training exercises, and/or comparative studies that examine different triage approaches applied to identical case conditions.

As shown by 436, an embodiment of the present invention may coordinate a sequential replay of actions by processing the organized action log records and systematically applying each recorded interaction to the duplicated case instance. An embodiment of the present invention may execute each action using original input parameters, timing characteristics, and/or component specifications documented in the action log records, shown by 412, creating an accurate reconstruction of the original triage process that may be paused, analyzed, and/or modified at any point during the replay sequence.

A second operational workflow may apply learned triage patterns to new open cases to provide automated or semi-automated triage assistance that leverages historical analyst expertise and established best practices, as shown by Apply Case Actions 446. Actions may be applied to open cases, as shown by 440, to identify active security cases that have not yet received analyst attention or have been assigned for triage but remain in preliminary processing stages. Open cases may be selected based on case type classifications, priority levels, alert characteristics, and/or other criteria that match the scope of available historical triage patterns stored within SIEM Action Log Database 410.

Triage action logs may be ingested from triaged cases, as shown by 442. An embodiment of the present invention may analyze the selected open case characteristics and retrieve relevant action log records that correspond to similar case types, threat patterns, and/or organizational contexts that provide applicable triage guidance for the current security incident.

Open SIEM cases may be selected, as shown by 444. An embodiment of the present invention may implement a matching algorithm that compares open case attributes with historical case characteristics to identify the most relevant triage patterns for application to the current security incident. Various factors may be considered such as alert types, observable indicators, threat intelligence classifications, and/or organizational policy requirements to select appropriate historical triage patterns that align with the current case context. Multiple historical triage patterns may be aggregated to create composite approaches that incorporate best practices from multiple analyst interactions or case resolution strategies.

An embodiment of the present invention may coordinate a sequential application of selected triage actions to the open case, executing each action using parameters and approaches derived from the historical action log records, as shown by 412, while adapting input data and component interactions to match the specific characteristics of the current case.

An embodiment of the present invention may support replaying case actions on duplicated cases and applying learned triage patterns to new open cases for automated or semi-automated triage assistance that enhances analyst productivity and maintains consistency in security operations processes. For example, an embodiment of the present invention may pause the automated triage process at predetermined points to enable analyst review and approval of proposed actions, creating a collaborative approach that combines automated efficiency with human expertise and judgment. In some cases, an entire triage process may be automatically completed for routine case types that follow predictable resolution patterns, while reserving complex or high-priority cases for analyst oversight and manual intervention. An embodiment of the present invention enables organizations to leverage historical triage expertise for training purposes through case replay scenarios and operational efficiency through intelligent automation of routine triage activities.

An embodiment of the present invention may operate across multiple SIEM systems by generalizing component definitions to enable cross-platform usage pattern analysis and comparison, allowing organizations with diverse security tool environments to benefit from consolidated triage pattern analysis and cross-platform best practice sharing. For example, SIEM Action Log Database, as shown by 410, may store generalized component classifications that abstract platform-specific implementation details while preserving the functional characteristics and operational outcomes of analyst interactions. Based on target SIEM platform capabilities, an embodiment of the present invention may translate generalized action patterns into platform-specific component interactions while maintaining the analytical intent and operational effectiveness of the original triage processes.

Figure 5:
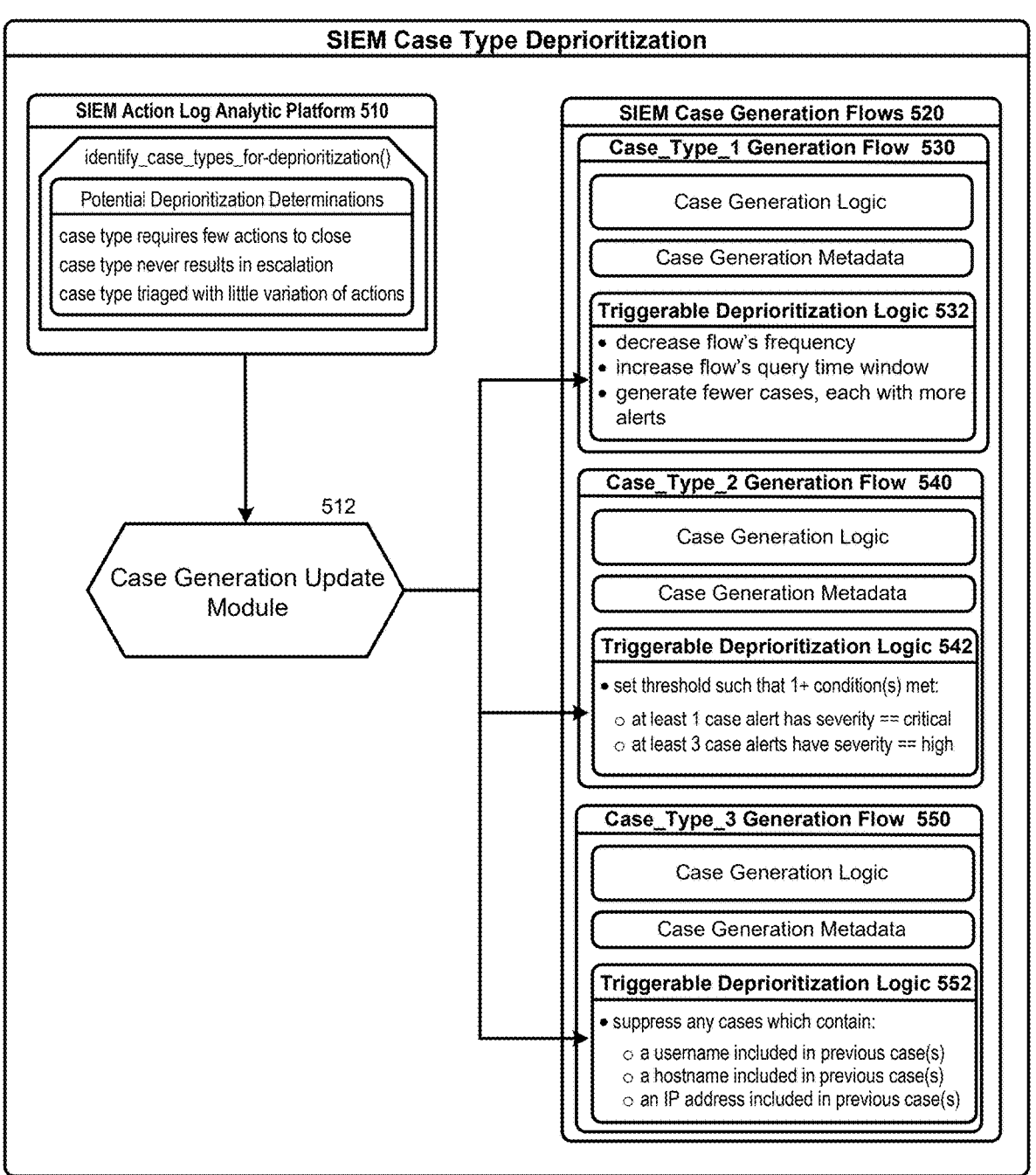
FIG. 5 is an exemplary diagram illustrating SIEM case type deprioritization, according to an embodiment of the present invention.

FIG. 5 is an exemplary diagram illustrating SIEM case type deprioritization, according to an embodiment of the present invention. An embodiment of the present invention is directed to SIEM case type deprioritization that provides automated adjustment of case generation processes based on analytical insights derived from analyst interaction patterns and case triage effectiveness measurements.

FIG. 5 illustrates a process of deprioritizing case generation flows. Each flow may correspond to a different case type and include some logic which may be automatically invoked as a result of SIEM Action Log Analytic Platform analysis. When this logic is invoked, the associated case type flow may output fewer cases to the SIEM. Other strategies for updating case generation flows as a result of action log analysis may also be implemented. For example, different case types may be prioritized. This may be triggered to result in higher case volume output for a particular case type. Other case characteristics and metrics may be prioritized.

As shown in FIG. 5, SIEM Action Log Analytic Platform 510 may process accumulated interaction data to identify case types that may warrant reduced priority or modified generation parameters. SIEM Action Log Analytic Platform 510 may communicate with SIEM Case Generation Flows 520 through a Case Generation Update Module 512 that coordinates the implementation of deprioritization strategies across multiple case generation workflows. Case Generation Update Module 512 may trigger a relevant case type's deprioritization logic to reduce case volume output.

SIEM Action Log Analytic Platform 510 may analyze patterns in analyst behavior, case resolution characteristics, and triage complexity factors to determine which case types consistently require minimal analytical effort, follow predictable resolution patterns, or demonstrate limited security impact based on historical triage outcomes.

SIEM Action Log Analytic Platform 510 may identify cases for deprioritization through systematic evaluation of multiple analytical criteria that indicate reduced case value or limited analyst engagement requirements. Cases that consistently require few actions to close may indicate routine security events that do not warrant extensive analytical resources or high-priority processing. SIEM Action Log Analytic Platform 510 may identify case types that never result in escalation to higher-tier analysts or management, suggesting that these cases represent low-impact security events that may be processed with reduced urgency or automated handling approaches. Additionally, SIEM Action Log Analytic Platform 510 may detect case types that are triggered with little variation in analyst actions, indicating predictable triage patterns that may benefit from streamlined processing or automated resolution workflows. The analytical determinations made by SIEM Action Log Analytic Platform 510 provide the foundation for triggering automated updates to case generation processes that optimize resource allocation and analyst productivity.

SIEM Case Generation Flows 520 may incorporate various workflows that create security cases based on different threat patterns, alert correlations, and/or organizational security policies.

A first case generation flow 530 may represent one category of case creation logic that processes specific types of security alerts or threat indicators to generate cases for analyst review. The first case generation flow 530 may include case generation logic that defines the criteria for case creation, alert aggregation rules, and initial case metadata assignments. The first case generation flow 530 also maintains case generation metadata that documents the operational parameters, historical performance characteristics, and configuration settings that govern the case creation process. A first deprioritization logic 532 within the first case generation flow 530 implements automated adjustments to case generation parameters when deprioritization signals are received from the Case Generation Update Module 512.

The first deprioritization logic module 532 may implement several strategies to reduce the volume and frequency of cases generated by the first case generation flow 530 while maintaining coverage of legitimate security threats. The first deprioritization logic module 532 may decrease flow frequency by extending the time intervals between case generation cycles, allowing more alerts to accumulate before triggering case creation processes. The first deprioritization logic module 532 may increase flow query time window parameters to gather alerts over longer time periods, resulting in larger case instances that consolidate multiple related alerts into single analytical units. This approach enables analysts to examine more comprehensive threat patterns while reducing the total number of individual cases requiring separate triage processes. The first deprioritization logic module 532 may also configure the case generation logic to generate fewer cases with more alerts per case, creating consolidated analytical units that provide broader threat context while reducing the administrative overhead associated with managing multiple smaller cases. Automatic case generation updates may support various scenarios including implementing case volume limits, applying case filtering criteria based on case-data field (e.g., hostname, IP, hash, domain, email address, payload size, location, etc.), applying case merging criteria based on various case-data field, modifying the case generation process frequency, etc.

A second case generation flow 540 represents an alternative case creation workflow that focuses on different threat categories, alert sources, and/or organizational priorities compared to the first case generation flow 530. The second case generation flow 540 incorporates similar structural components including case generation logic and case generation metadata that define the operational parameters and historical characteristics of the workflow. A second deprioritization logic module 542 within the second case generation flow 540 implements alternative deprioritization strategies that address the specific characteristics and requirements of the threat patterns processed by this workflow. The second deprioritization logic module 542 may establish severity-based filtering criteria that restrict case generation to alerts meeting elevated threat thresholds, ensuring that deprioritized workflows continue to surface high-impact security events while reducing the volume of routine or low-priority cases.

The second deprioritization logic module 542 may set thresholds such that at least one case alert has critical severity before triggering case creation, ensuring that deprioritized case types maintain coverage of the most serious security threats. In addition, the second deprioritization logic module 542 may require that at least three case alerts have high severity before initiating case generation processes, creating a balanced approach that considers both individual alert criticality and aggregate threat indicators. These severity-based restrictions enable the second case generation flow 540 to maintain focus on legitimate security threats while reducing the processing burden associated with routine security events that may not warrant immediate analyst attention. The severity thresholds implemented by the second deprioritization logic module 542 may be dynamically adjusted based on organizational threat levels, analyst workload characteristics, or seasonal variations in security event patterns.

A third case generation flow 550 provides additional case creation capabilities that address specialized threat scenarios or organizational requirements that differ from the first case generation flow 530 and second case generation flow 540. The third case generation flow 550 incorporates case generation logic and case generation metadata that define the operational parameters specific to the threat patterns and alert characteristics processed by this workflow. A third deprioritization logic module 552 implements filtering criteria that suppress case generation for alerts involving entities that have been recently analyzed or processed through previous case instances. The third deprioritization logic module 552 may suppress cases containing usernames, hostnames, or IP addresses that were included in previous cases within a specified time window, reducing duplicate analytical effort while maintaining comprehensive threat coverage.

Case Generation Update Module 512 may coordinate communication between SIEM Action Log Analytic Platform 510 and SIEM Case Generation Flows 520 to trigger relevant deprioritization logic when analytical findings indicate that specific case types warrant reduced priority or modified generation parameters. Case Generation Update Module 512 may implement deprioritization strategies such as increasing query windows, adding severity restrictions, or implementing user-based filtering criteria based on the specific characteristics and requirements identified by the analytic platform 510. When SIEM Action Log Analytic Platform 510 identifies a case type for deprioritization, Case Generation Update Module 512 may transmit configuration updates to the appropriate case generation flow within SIEM Case Generation Flows 520, activating the corresponding deprioritization logic module to implement the recommended adjustments. Case Generation Update Module 512 may coordinate simultaneous updates across multiple case generation flows when analytical findings indicate that broader adjustments to case generation priorities are warranted based on organizational threat patterns or analyst workload considerations.

The systems and methods described herein address technical problems specific to computer-implemented SIEM platforms and provide concrete technological improvements to the functioning of security information management systems. The wrapper component that intercepts analyst interactions represents a technical solution that operates at the system level to capture granular interaction data without disrupting existing analyst workflows or requiring modifications to underlying SIEM components. This interceptive mechanism may implement low-level system hooks, API monitoring techniques, and/or middleware integration approaches that enable transparent data collection while maintaining system performance and reliability.

The action log database stores structured interaction data in specialized formats that enable efficient querying and analysis of temporal sequences, component usage patterns, and case state transitions. The database may implement optimized indexing strategies, time-series data structures, and relational schemas specifically designed to support rapid retrieval of chronologically ordered analyst actions across multiple case instances and analyst sessions. The technical implementation may include database partitioning approaches that organize action logs by temporal periods, analyst identifiers, or case types to enable parallel processing and reduce query response times for large-scale analytical operations.

The analytic platform performs computational analysis of accumulated interaction data using algorithmic approaches that identify statistical patterns, detect anomalies, and generate predictive models based on historical analyst characteristics. The platform may implement machine learning algorithms, statistical analysis techniques, and pattern recognition methods that process large volumes of interaction data to extract actionable insights about system usage and analyst productivity. The computational processes may include clustering algorithms that group similar case types, regression analysis that predicts case completion times, and classification methods that identify optimal triage approaches for different threat categories.

The automatic updates to case generation processes represent technical modifications to computer-implemented workflows that adjust system behavior based on analytical findings. These updates may involve programmatic changes to database queries, algorithmic modifications to alert correlation logic, and dynamic configuration adjustments that alter case creation parameters without requiring manual intervention. The technical implementation may include configuration management systems, automated deployment mechanisms, and rollback capabilities that ensure system stability while enabling responsive adaptation to changing analytical requirements.

The case action replay functionality provides technical capabilities for reconstructing historical analyst interactions through systematic recreation of system states and sequential execution of recorded actions. This replay mechanism may implement state management techniques, transaction logging approaches, and rollback capabilities that enable accurate reconstruction of complex multi-step triage processes. The technical implementation may include memory management optimizations, concurrent processing capabilities, and error handling mechanisms that ensure reliable replay operations across different system configurations and case complexity levels.

While the processes of the Figures illustrate certain steps performed in a particular order, it should be understood that the embodiments of the present invention may be practiced by adding one or more steps to the processes, omitting steps within the processes and/or altering the order in which one or more steps are performed.

The system components illustrated in the Figures above are exemplary and illustrative and may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The systems illustrated above may be implemented in a variety of ways. Architecture within the illustrated systems may be implemented as hardware components (e.g., module) within one or more network elements. It should also be appreciated that architecture within the systems may be implemented in computer executable software (e.g., on a tangible, non-transitory computer-readable medium) located within one or more network elements. Module functionality of architecture within the systems may be located on a single device or distributed across a plurality of devices including one or more centralized servers and one or more mobile units or end user devices. The architecture depicted in the systems is meant to be exemplary and non-limiting. For example, while connections and relationships between the elements of the systems are depicted, it should be appreciated that other connections and relationships are possible. The systems described above may be used to implement the various methods herein, by way of example. Various elements of the systems may be referenced in explaining the exemplary methods described herein.

Connections illustrated in the Figures above may represent networks including wireless network, a wired network or any combination of wireless network and wired network. Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although the connections in the Figures may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the Figures above illustrate individual devices or components, it should be appreciated that there may be several of such devices to carry out the various exemplary embodiments. Systems may communicate using any mobile or computing device capable of sending or receiving network signals.

Systems may be communicatively coupled to various local and remote storage components. These storage components may include any suitable data structure to maintain the information and allow access and retrieval of the information. The storage may be local, remote, or a combination. The storage components may have back-up capability built in. Communications with the storage components may be over a network or communications may involve a direct connection between the various storage components, as depicted in the Figures above. The storage components may also represent cloud or other network based storage.

Those skilled in the art will appreciate that the diagrams discussed above are merely examples of a system and a method for implementing a SIEM triage action analysis feedback loop and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, .NET, Python, Java, Modula-2, Pascal, Prolog, REXX, Visual Basic, JavaScript and other languages. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system for analyzing Security Information and Event Management (SIEM) triage actions, comprising:

an interface configured to receive one or more interactions from an analyst through an interactive user interface or an application programming interface (API);

a database configured to store action logs wherein each action log comprises metadata associated with an interaction and a case state information; and an analytic platform comprising a computer processor coupled to the interface and the database and further configured to perform the steps of:

receiving one or more analyst interactions with at least one SIEM component;

extracting case state information before and after each analyst interaction;

storing one or more action logs in the database, wherein each action log comprises metadata associated with the one or more analyst interactions and the extracted case state information;

automatically analyzing, using a wrapper component, the one or more action logs to identify patterns in analyst behavior and one or more case characteristics, wherein the wrapper component is configured to intercept analyst interactions with the at least one SIEM component by implementing system hooks that transparently capture interaction data without disrupting analyst workflows;

generating a notification based on the identified patterns; and automatically updating parameters of a SIEM case generation process based on the identified patterns, wherein the updating comprises applying deprioritization logic that suppresses case generation based on the identified patterns and dynamically adjusts case creation parameters.

2. The computer-implemented system of claim 1, wherein the metadata comprises a combination of: a case identifier, an analyst identifier, a SIEM component identifier, an action time duration, an action data size, an action timestamp, an input data provided by the analyst, and error information.

3. The computer-implemented system of claim 1, wherein the case state information comprises one or more of: a case status, a number of comments, a number of alerts, a number of observables, evidence associated with a case, full case comments or full case alerts.

4. The computer-implemented system of claim 1, wherein the analytic platform is further configured to identify one or more of: underused SIEM components, error-prone components, slow-running components, and outlier cases based on a component usage pattern.

5. The computer-implemented system of claim 1, wherein the analytic platform is further configured to generate a case interaction timeline by organizing the action logs chronologically based on timestamps and case identifiers.

6. The computer-implemented system of claim 5, wherein the analytic platform is further configured to compile an average case interaction pattern for an individual analyst or a group of analysts across multiple different case types.

7. The computer-implemented system of claim 6, wherein the analytic platform is further configured to compare analyst usage patterns to identify efficient and inefficient triage behavior.

8. The computer-implemented system of claim 1, wherein automatically updating the SIEM case generation process further comprises one or more of: modifying query time windows, implementing alert severity restrictions, adding user-based filtering criteria, implementing case volume limits, applying case filtering criteria, applying case merging criteria or applying case generation process frequency.

9. The computer-implemented system of claim 1, wherein the analytic platform is further configured to replay one or more triage actions on cases by duplicating a case and sequentially applying stored action logs to understand triage strategies.

10. The computer-implemented system of claim 9, wherein the analytic platform is further configured to apply at least one action log from one or more previously triaged cases to a new open case to provide automated initial triage.

11. A computer-implemented method for analyzing analyst interactions with a Security Information and Event Management (SIEM) system, comprising the steps of:
   receiving, via an interface, one or more analyst interactions with at least one SIEM component;
   extracting, via the interface, case state information before and after each analyst interaction;
   storing, via a database, one or more action logs in the database, wherein each action log comprises metadata associated with the one or more analyst interactions and the extracted case state information;
   automatically analyzing, via an analytic platform comprising a computer processor and using a wrapper component, the one or more action logs to identify patterns in analyst behavior and one or more case characteristics, wherein the wrapper component is configured to intercept analyst interactions with the at least one SIEM component by implementing system hooks that transparently capture interaction data without disrupting analyst workflows;
   generating, via the computer processor, a notification based on the identified patterns; and
   automatically updating, via the computer processor, parameters of a SIEM case generation process based on the identified patterns, wherein the updating comprises applying deprioritization logic that suppresses case generation based on the identified patterns and dynamically adjusts case creation parameters.

12. The computer-implemented method of claim 11, wherein the metadata comprises a combination of: a case identifier, an analyst identifier, a SIEM component identifier, an action time duration, an action data size, an action timestamp, an input data provided by the analyst, and error information.

13. The computer-implemented method of claim 11, wherein the case state information comprises one or more of: a case status, a number of comments, a number of alerts, a number of observables, evidence associated with a case, full case comments or full case alerts.

14. The computer-implemented method of claim 11, wherein the analytic platform is further configured to identify one or more of: underused SIEM components, error-prone components, slow-running components, and outlier cases based on a component usage pattern.

15. The computer-implemented method of claim 11, further comprising the step of:
   generating a case interaction timeline by organizing the action logs chronologically based on timestamps and case identifiers.

16. The computer-implemented method of claim 15, further comprising the step of:
   compiling an average case interaction pattern for an individual analyst or a group of analysts across multiple different case types.

17. The computer-implemented method of claim 16, further comprising the step of:
   comparing analyst usage patterns to identify efficient and inefficient triage behavior.

18. The computer-implemented method of claim 11, wherein automatically updating the SIEM case generation process further comprises one or more of: modifying query time windows, implementing alert severity restrictions, adding user-based filtering criteria, implementing case volume limits, applying case filtering criteria, applying case merging criteria or applying case generation process frequency.

19. The computer-implemented method of claim 11, further comprising the step of:
   replaying one or more triage actions on cases by duplicating a case and sequentially applying stored action logs to understand triage strategies.

20. The computer-implemented method of claim 19, further comprising the step of:
   applying at least one action log from one or more previously triaged cases to a new open case to provide automated initial triage.

* * * * *